United States Patent
Yates et al.

(10) Patent No.: US 10,852,436 B2
(45) Date of Patent: Dec. 1, 2020

(54) IMAGING SYSTEM AND METHOD FOR MONITORING A FIELD OF VIEW

(71) Applicant: Rockwell Automation Limited, Buckinghamshire (GB)

(72) Inventors: Chris Yates, Edinburgh (GB); Chris Softley, Gorebridge (GB)

(73) Assignee: Rockwell Automation Limited, Buckinghamshire (GB)

( * ) Notice: Subject to any disclaimer, the term of this patent is extended or adjusted under 35 U.S.C. 154(b) by 603 days.

(21) Appl. No.: 15/350,022

(22) Filed: Nov. 12, 2016

(65) Prior Publication Data
US 2017/0059712 A1 Mar. 2, 2017

Related U.S. Application Data

(63) Continuation of application No. PCT/EP2015/060207, filed on May 8, 2015.

(30) Foreign Application Priority Data

May 15, 2014 (DE) .................. 10 2014 106 854

(51) Int. Cl.
*G01S 17/89* (2020.01)
*G01S 7/483* (2006.01)
(Continued)

(52) U.S. Cl.
CPC ............ *G01S 17/89* (2013.01); *G01S 7/4802* (2013.01); *G01S 7/483* (2013.01); *G01S 17/18* (2020.01); *G01S 17/58* (2013.01)

(58) Field of Classification Search
CPC ...... G01S 17/89; G01S 7/4861; G01S 7/4863; G01S 7/4865; G01S 7/4868; G01S 7/4915; G01S 7/4913; G01C 3/00
(Continued)

(56) References Cited

U.S. PATENT DOCUMENTS

| | | | | |
|---|---|---|---|---|
| 4,855,932 A | * | 8/1989 | Cangiani | G01S 3/7864 342/77 |
| 6,100,517 A | * | 8/2000 | Yahav | G01C 11/025 250/208.1 |

(Continued)

FOREIGN PATENT DOCUMENTS

| CN | 101114021 A | 1/2008 |
|---|---|---|
| CN | 102802509 A | 11/2012 |

(Continued)

OTHER PUBLICATIONS

Office Action dated Nov. 21, 2018 issued in Chinese counterpart application No. 2015800333549 and English language translation thereof.
(Continued)

*Primary Examiner* — Islam A Alsomiri
*Assistant Examiner* — Amir J Askarian
(74) *Attorney, Agent, or Firm* — Amin, Turocy & Watson, LLP (57) ABSTRACT

An imaging system is provided for monitoring a field of view with a two-dimensional array of photo elements on which the field of view is imaged. The imaging system determines for each photo element a distance between the photo element and a surface of an object in the field of view by light emitted into the field of view and subsequently arriving on the photo elements and to determine a distance vector to form a coordinate image that includes the distance vector. A first memory unit stores the coordinate image, a second memory unit stores logical relations for the photo elements. A processing unit determines for each of the photo elements whether a logical relation is fulfilled and outputs a trigger signal when at least one of the logical relations is fulfilled.

23 Claims, 8 Drawing Sheets

(51) Int. Cl.
*G01S 17/18* (2020.01)
*G01S 7/48* (2006.01)
*G01S 17/58* (2006.01)

(58) Field of Classification Search
USPC .............................................. 356/3.01–5.15
See application file for complete search history.

(56) References Cited

U.S. PATENT DOCUMENTS

| | | | | |
|---|---|---|---|---|
| 6,556,692 | B1* | 4/2003 | Gavrila | G06K 9/00818 |
| | | | | 382/104 |
| 7,202,898 | B1* | 4/2007 | Braun | G01C 3/08 |
| | | | | 250/559.08 |
| 10,048,280 | B2 | 8/2018 | Yarino et al. | |
| 10,048,380 | B2 | 8/2018 | Yarino et al. | |
| 2001/0052939 | A1* | 12/2001 | Riedel | G06T 1/00 |
| | | | | 348/294 |
| 2004/0156034 | A1* | 8/2004 | Cahill | G06T 7/521 |
| | | | | 356/5.04 |
| 2006/0075422 | A1* | 4/2006 | Choi | G01S 3/7864 |
| | | | | 725/18 |
| 2006/0227317 | A1* | 10/2006 | Henderson | G01B 11/026 |
| | | | | 356/28 |
| 2008/0285842 | A1 | 11/2008 | Plasberg et al. | |
| 2009/0040095 | A1* | 2/2009 | Ogawa | G01S 7/487 |
| | | | | 342/70 |
| 2009/0315978 | A1* | 12/2009 | Wurmlin | G06T 5/005 |
| | | | | 348/43 |
| 2010/0085437 | A1* | 4/2010 | Troy | G01S 3/7864 |
| | | | | 348/211.7 |
| 2010/0214554 | A1* | 8/2010 | Audier | G01S 7/487 |
| | | | | 356/5.01 |
| 2011/0210253 | A1* | 9/2011 | Micko | G01J 5/0846 |
| | | | | 250/349 |
| 2011/0215915 | A1* | 9/2011 | Lee | B60Q 1/00 |
| | | | | 340/435 |
| 2011/0304710 | A1* | 12/2011 | Ito | A63F 13/655 |
| | | | | 348/51 |
| 2013/0004016 | A1* | 1/2013 | Karakotsios | G06K 9/00355 |
| | | | | 382/103 |
| 2013/0064531 | A1* | 3/2013 | Pillman | H04N 5/23296 |
| | | | | 396/62 |
| 2013/0293705 | A1* | 11/2013 | Schorr | G01B 11/24 |
| | | | | 348/135 |
| 2014/0189320 | A1* | 7/2014 | Kuo | G06F 9/3001 |
| | | | | 712/222 |
| 2015/0131080 | A1* | 5/2015 | Retterath | G01S 17/10 |
| | | | | 356/5.01 |
| 2015/0301177 | A1* | 10/2015 | Tsukamoto | G01S 17/89 |
| | | | | 356/5.03 |
| 2016/0164261 | A1* | 6/2016 | Warren | H01S 5/18388 |
| | | | | 348/164 |

FOREIGN PATENT DOCUMENTS

| | | |
|---|---|---|
| CN | 103797329 A | 5/2014 |
| JP | 2006-287650 A | 10/2006 |
| JP | 2013-73459 A | 4/2013 |
| JP | 2014-74939 A | 4/2014 |
| WO | 0204247 A1 | 1/2002 |
| WO | WO 02/04247 A1 * | 1/2002 ............... G60Q 1/08 |

OTHER PUBLICATIONS

International Search report issued in PCT/EP2015/060207, on which this application is based, dated Aug. 6, 2015.
Written Opinion of the International Searching Authority issued in PCT/EP2015/060207, on which this application is based, dated Aug. 6, 2015.
Second Office Action received for Chinese Patent Application Serial No. 2015800333549 dated May 28, 2019, 8 pages (Including English Translation).
Notice of Reasons for Refusal received for Japanese Patent Application Serial No. 2017-512111 dated Oct. 1, 2018, 6 pages (Including English Translation).
Communication pursuant to Article 94(3) EPC received for EP Patent Application Serial No. 15724544.0 dated Sep. 5, 2019, 7 pages.
Communication pursuant to Article 94(3) EPC received for European Patent Application Serial No. 15724544 dated Aug. 7, 2020, 9 pages.

* cited by examiner

IMAGING SYSTEM AND METHOD FOR MONITORING A FIELD OF VIEW

CROSS REFERENCE TO RELATED APPLICATIONS

This application is a continuation application of international patent application PCT/EP2015/060207, filed May 8, 2015, designating the United States and claiming priority from German application 10 2014 106 854.8, filed May 15, 2014, and the entire content of both applications is incorporated herein by reference.

FIELD OF THE INVENTION

The invention relates to an imaging system for monitoring a field of view and a method for monitoring the field of view.

BACKGROUND OF THE INVENTION

It is desirable to determine parameters of vehicles, in particular, of moving vehicles. These parameters can be used in many ways. For example, a measurement of traffic volume and traffic speed can be used to predict traffic jams or to dynamically adjust speed limits in order to control the flow of the traffic. It is also conceivable to take a photo of the driver which can be used in the apprehension of criminals or of the number license plate. Other parameters about the vehicles include vehicle type, for example a differentiation between a car and a truck, number of axels, vehicle speed, vehicle direction, license plate number and vehicle weight.

Current systems for determining these parameters require the use of multiple sensors. For example, a laser scanner is used to detect the presence or the absence of a vehicle at a predefined location. As soon as the presence of a vehicle is detected by the laser scanner, a high-resolution video camera captures a photo or a film of the vehicle. If a change of the position of the predefined location is necessary, a physical adjustment of the laser scanner is required. This requires also that the laser scanner is made accessible for a human being or the laser scanner must be provided with motor-driven displacement units.

SUMMARY OF THE INVENTION

It is an object of the invention to provide an imaging system and a method for monitoring a field of view with the imaging system, wherein the imaging system has a simple design and the method is simple to perform.

According to an aspect of the invention, the imaging system for monitoring a field of view includes a two-dimensional array of photo elements on which the field of view is imaged. The imaging system is configured to determine for each of the photo elements a distance between the respective photo element and a surface of an object located in the field of view by light emitted by the imaging system into the field of view and subsequently arriving on the photo elements and to determine for each of the distances a distance vector with at least one component to form a coordinate image that includes the distance vectors, a first memory unit configured to store the coordinate image, a second memory unit storing for at least one of the photo elements a logical relation that has for at least one of the components the form that the respective component is larger than or equal to a predetermined lower value, and the component is smaller than or equal to a predetermined upper value, and a processing unit adapted to inquire for each of the photo elements if the logical relation is fulfilled and to output a trigger signal in case at least one of the logical relations is fulfilled.

Further, a method for monitoring a field of view with an imaging system with a two-dimensional array of elements on which the field of view is imaged is provided. The imaging system is configured to determine for each of the elements a distance between the respective element and a surface of an object located in the field of view, wherein each of the distances can be used to form a distance vector with at least one component to form a coordinate image including the distance vectors. The method includes the steps of: a) predetermining for at least one of the elements a logical relation that has for at least one of the components the form that the respective component is larger than or equal to a predetermined lower value, and the component is smaller than or equal to a predetermined upper value; b) determining for each element the distance between the respective element and the surface of an object located in the field of view; c) determining for the each of the distances the distance vector; d) storing the coordinate image; e) inquiring for each of the elements if the logical relation is fulfilled; f) repeating steps b) to e) at least until at least one logical relation is fulfilled; g) outputting a trigger signal in case at least one logical relation is fulfilled.

By using the specific form for the logical relations, the logical relations define a volume within the field of view and a trigger signal is provided in case the surface of an object is located within the volume. Since the volume is defined by the logical relations, the location and the extensions of the volume can be changed by simply overwriting the logical relations stored in the second memory unit by new logical relations. Therefore, the imaging system and the method provide a flexible volume that is used to provide the trigger signal, so that the imaging system can be used in a large variety of situations. Furthermore, a physical access of the imaging system or a physical displacement of parts of the imaging system for shifting the volume and changing its shape is advantageously not necessary. Since the imaging system determines the distances, only a moving object can provide the trigger signal and not an intensity change that would be detected by a conventional video imaging system. The intensity change can for example be caused by rain, shadows, puddles, fog, clouds, reflections therefrom or ambient light changes, in particular ambient light changes throughout the day. The trigger signal can be used to start another action or action sequence of the imaging system, for example the action can include taking a photograph of the same object that caused the imaging system to output the trigger signal.

According to an aspect of the invention, the predetermined lower values and the predetermined upper values are chosen such that the logical relations describe a volume within the field of view, wherein the volume has such extensions that with a given repetition rate for determining the coordinate images and an assumed maximum speed of the object at least one coordinate image shows the surface of the object within the volume. Therefore, it is advantageously ensured that every object moving slower than or equal to the maximum speed is captured by the imaging system and causes the imaging system to output the trigger signal. According to another aspect of the invention, at least one of the predetermined lower values is either minus infinity or at least one of the predetermined upper values is plus infinity. In this case, only one inequality instead of two inequalities has to be determined, which is computationally simple and step e) can be carried out in a short period of time and therefore a higher repetition rate for repeating steps b) to e) can be achieved.

The imaging system preferably includes an interface with which a user can set the logical relations. This has the advantage that a single imaging system may be configured in many ways to adapt it for different situations. The interface can be remote, allowing the imaging system to be dynamically reconfigured by users distant to the location of the field of view. It is preferred that the photo elements are also adapted to measure a photograph of the field of view. Therefore, only one array needs to be provided for the imaging system, wherein the imaging system can be used to detect both the presence of an object within the volume and to take the photograph of the object, which makes the imaging system cost-efficient. Many types of information can be extracted from the photograph, for example the photograph can be used to extract a license number plate or the photograph can be used for the identification of a human being. The photo elements can also be adapted to take a plurality of subsequent photographs in order to record a video sequence of the field of view.

According to an aspect of the invention, in step e), each coordinate image is stored together with a timestamp. With the timestamp, it is advantageously possible to determine when the object is located within the volume. The elements are preferably the photo elements.

According to another aspect of the invention, in step b), the imaging system illuminates the field of view with light pulses with a duration $T_p$ and the photo elements capture the light pulses back reflected from the field of view during a first temporal integration gate having an integration start point in time $T_{1b}$ and an integration end point in time $T_{1e}$ and during a second temporal integration gate having an integration start point in time $T_{2b}$ and an integration end point in time $T_{2e}$, wherein the integration gates have such a predetermined delay to the emission start point in time of the light pulses that either $T_0$ or $T_0+T_p$ are between $T_{1b}$ and $T_{1e}$ in order to determine a signal value U with the signal value U depending on the intensity $I_p$ and the duration of the light pulse arriving on the photo element during the first integration gate and that $T_0$ and $T_0+T_p$ is between $T_{2b}$ and $T_{2e}$ in order to determine the intensity $I_p$ of the light pulses arriving on the photo element, with $T_0$ being the first point in time when the light pulse arrives on the photo element, wherein the imaging system calculates the distance for each photo element by using U and $I_p$. In order to arrange the integration gates with respect to the emission start point in time, a distance range in which the object can be located is predetermined. From the distance range, $T_p$, $T_{1b}$ and $T_{1e}$ can be selected such that either $T_0$ or $T_0+T_p$ is between $T_{1b}$, and $T_{1e}$ for all possible distances of the distance range. $T_{2b}$ and $T_{2e}$ can then be selected such that $T_0$ and $T_0+T_p$ are between $T_{2b}$ and $T_{2e}$ for all possible distances of the distance range.

Alternatively, in step b), the imaging system illuminates the field of view with light that switches its intensity at a point in time $T_c$ from an intensity $I_{out,h}$ to an intensity $I_{out,l}$ being lower than $I_{out,h}$ and at a point in time $T_c+T_p$ back to $I_{out,h}$ and the photo elements capture the light back reflected from the field of view during a first temporal integration gate having an integration start point at time $T_{1b}$ and an integration end point at time $T_{1e}$ as well as during a second temporal integration gate having an integration start point in time $T_{2b}$ and an integration end point at time $T_{2e}$, wherein the integration gates have such a predetermined delay to $T_c$ that either $T_0$ or $T_0+T_p$ is between $T_{1b}$ and $T_{1e}$ in order to determine a signal value U with the signal value U depending on the amount of light arriving on the photo element during the first integration gate and that $T_{2e}$ is earlier than $T_0$ or $T_{2b}$ is later than $T_0+T_p$ or $T_0$ and $T_0+T_p$ are between $T_{2b}$ and $T_{2e}$ in order to determine the intensity $I_{in,h}=I_p$ of the light arriving on the photo element and corresponding to the higher intensity $I_{out,h}$, with $T_0$ being the first point in time when light with the intensity $I_{in,l}$ corresponding to lower intensity $I_{out,l}$ arrives on the photo element, wherein the imaging system calculates the distance for each photo element by using U and $I_{in,h}=I_p$. In order to arrange the integration gates with respect to $T_c$, a distance range in which the object can be located is predetermined. From the distance range $T_p$, $T_{1b}$ and $T_{1e}$ can be selected such that either $T_0$ or $T_0+T_p$ is between $T_{1b}$ and $T_{1e}$ for all possible distances of the distance range. $T_{2b}$ and $T_{2e}$ can then be selected such that $T_{2e}$ is earlier than $T_0$ or $T_{2b}$ is later than $T_0+T_p$ for all possible distances of the distance range.

By determining the distance in this manner, the time of flight of the light pulse from the emission to the arrival on the photo element after being back reflected from the object is determined. By determining the time of flight of the light pulse the distance can advantageously be determined unambiguously, which is not the case if the distance is for example determined by periodically modulating the light intensity which is emitted from another device and by measuring the phase difference between the emitted light and the back reflected light arriving on a detector of the device.

According to yet another aspect of the invention, in step a), the predetermined lower values and the predetermined upper values are selected such that the logical relations describe a volume within the field of view, wherein the volume has such extensions that with a given repetition rate for determining the coordinate images and an assumed maximum speed of the object at least one coordinate image shows the surface of the object within the volume. According to another aspect of the invention, in step a), at least one of the predetermined lower values is either minus infinity or at least one of the predetermined upper values is plus infinity.

According to an aspect of the invention, in step f), the steps b) to e) are repeated until a plurality of logical relations of neighbouring elements is fulfilled, and in step g), the trigger signal is output in case the plurality of the logical relations is fulfilled. Therefore, it is advantageously achieved that only objects exceeding a certain size cause the output of the trigger signal. The plurality of the logical relations can for example be selected such that a bird flying through the volume does not cause the output of the trigger signal but an automobile does cause the output of the trigger signal.

Each distance vector preferably includes the distance as the at least one component, in particular, each distance vector includes the distance or of spherical coordinates (r, θ, Φ), with r being the distance, θ being the polar angle as a second component and Φ being the azimuthal angle as a third component. Using only the distance r as the only component is the computationally simplest method. The spherical coordinates are especially convenient if a coordinate system with respect to the imaging system is set up. The zenith of the spherical coordinate system can be defined by the optical axis of the imaging system and the origin of the spherical coordinate system can be defined by the array, whereby the line of sight of a single pixel is defined by a pair of angles θ and Φ, which is a mathematically simple description of the field of view and therefore data processing carried out by the processing unit is fast.

Alternatively, each distance vector may include Cartesian coordinates (x, y, z), with x being a first component, y being a second component and z being a third component, determined by a coordinate transformation from (r, θ, Φ) to (x, y, z), with r being the distance, and the method includes the step of: a1) providing for each photo element a pair of angles θ, Φ of a spherical coordinate system, wherein the pair describes a line of sight of the photo element. The Cartesian coordinates are especially convenient if a coordinate system independent of the position and the orientation of the imaging system is to be set up. One of the axes x, y and z could for example be oriented in the direction of traffic on a street.

According to an aspect of the invention, the method includes the step of: h) capturing at least one photograph with the array in case the trigger signal was output. The method preferably includes the step of: i) taking a sequence of coordinate images by triggering the sequence with the trigger signal and by repeating steps b) to d) with each coordinate image having a timestamp. With the sequence of the coordinate images together with the timestamp, it is possible to determine speed, direction, velocity, and, provided that the sequence includes at least three coordinate images, and acceleration of the object. In step i), the sequence is preferably ended in case the distance vector drops back to a distance vector related to the absence of an object in the line of sight of the photo element. According to another aspect of the invention, a second set of logical relations is provided and the processing unit outputs a second trigger signal in case at least one of the logical relations of the second set is fulfilled and in step i), the sequence is ended in case the second trigger signal was output. The second set of logical relations defines a second volume in the field of view and the object causes the sequences to be ended when its surface is located within the second volume. According to an aspect of the invention, the method includes the step of: j) determining the speed of the object by using the time difference between the first trigger signal and the second trigger signal. This provides a computationally simple method for determining the speed of the object, using only the time difference and the distance between the first volume and the second volume.

According to an aspect of the invention, the object is an automobile and the method includes the step of: k) identifying the position of the license number plate of the automobile by identifying the photo elements that determine the highest intensities $I_p$ of the light pulses arriving on the array. The license number plate includes a retro-reflective material having a large number of cubes and/or prisms on its surface for the reflection of light. The illumination of the license number plates with the light pulses leads to a very strong reflection that can be detected by the second integration gate. It is therefore possible with the method to determine a coordinate image of the object and to identify the location of the license number plate at the same time by using the same dataset of signal values U and intensities $I_p$ determined by the array. Since a photograph of the field of view can be taken with the same array, it is further possible to use the location of the license number plate as identified in step k) to locate the number license plate in the photograph.

The method preferably includes the step of: l) determining the velocity of the automobile by taking a sequence of coordinate images by triggering the sequence with the trigger signal and by repeating steps b) to d) with each coordinate image having a timestamp and by using the position of the license number plate in each coordinate image. By using the license number plate, it is ensured that in each coordinate image the same part of the automobile is used for determining the velocity, which results in a high precision of the velocity.

According to another aspect of the invention, the method includes the step of: m) taking a photograph of a detail of the field of view in case the trigger signal was provided, wherein the position of the detail is located with respect to the position of the license number plate. In this step, the position of the license number plate is used in order to zoom to the detail, wherein the detail can for example be the license number plate itself or the driver of the automobile.

According to yet another aspect of the invention, the method includes the step of: n) generating a signature for at least one photo element including a plot of the distance vector over time and using the signature for a classification of the object. The classification includes a distinction between different objects, for example between a car, a truck or a motorcycle. The classification can be carried out by applying logical relations to the plot or by determining reference signatures of reference objects and comparing the signatures with the reference signatures, wherein both methods are computationally simple methods for automatically classifying the objects.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
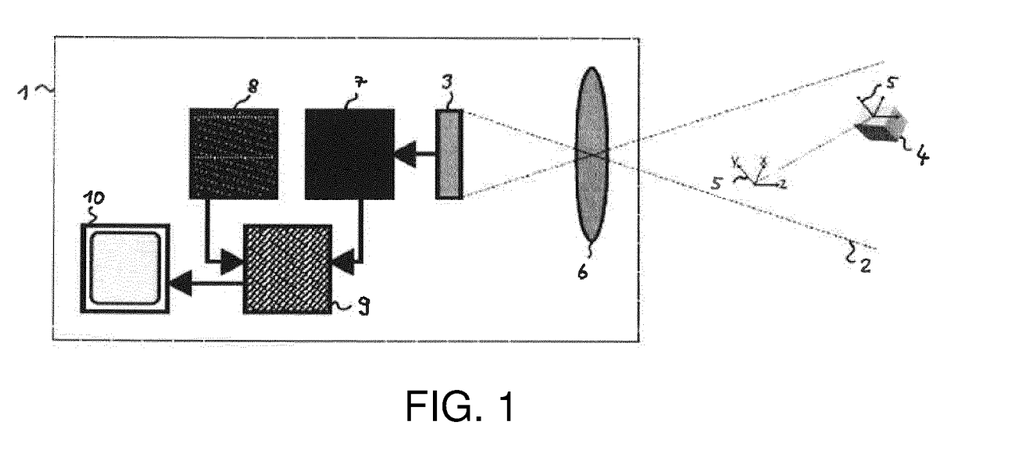
FIG. 1 shows an imaging system with its field of view according to an exemplary embodiment of the invention.

FIG. 1 shows an imaging system 1 which includes a two-dimensional array 3 of photo elements 44 and a lens 6 that projects a field of view 2 on the array 3. The imaging system 1 further includes a light source (not shown) configured to illuminate the field of view 2 with light pulses, in particular for a duration in the order of nanoseconds or picoseconds, and in particular with a rectangular temporal profile. The light pulses can be in the visible and/or in the infrared spectral region. The imaging system 1 is configured to determine the time of flight of the light pulses for each photo element 44 from the emission from the light source to the arrival on the respective photo element 44 after the light pulse has been back reflected from a surface of an object 4 located in the field of view 2, wherein the surface is facing towards the lens 6. The imaging system 1 is further configured to calculate the distance between the photo element 44 and the surface of the object 4 from the time of flight and the speed of light.

The imaging system 1 is configured to determine a distance vector from each distance, wherein each distance vector includes at least one component. The distance vectors of all the photo elements 44 form a coordinate image. In a first exemplary embodiment, each distance vector includes a distance r as the only component. In a second exemplary embodiment, each distance vector includes the distance r as a first component, a polar angle θ as a second component, and an azimuthal angle Φ as a third component, wherein r, θ, Φ are the components of a spherical coordinate system. The zenith of the spherical coordinate system can be defined by the optical axis of the lens 6 and the origin of the spherical coordinate system can be defined by the centre of the array 3. In a third exemplary embodiment, each distance vector includes x as a first component, y as a second component, and z as a third component, wherein x, y, and z are coordinates of a Cartesian coordinate system 5. The distance vectors in the third exemplary embodiment can be calculated by a coordinate transformation from (r, θ, Φ) to (x, y, z).

The imaging system 1 further includes a first memory unit 7 configured to store the coordinate image or to store a plurality of coordinate images, so that data processing can be carried out with the coordinate images. The imaging system 1 includes a second memory unit 8 configured to store for at least one of the photo elements 44 a logical relation in the form $v_{l,i} \leq component_i \leq v_{u,i}$ for at least one of the components of the distance vector, with $v_{l,i}$ being a predetermined lower value and $v_{u,i}$ being a predetermined upper value for the i-th component$_i$ of the distance vector. The lower values $v_{l,i}$ and the upper values $v_{u,i}$ together with the arrangement of the coordinate system for the distance vectors are chosen such that the logical relations describe a volume 12 within the field of view 2.

Figure 2:
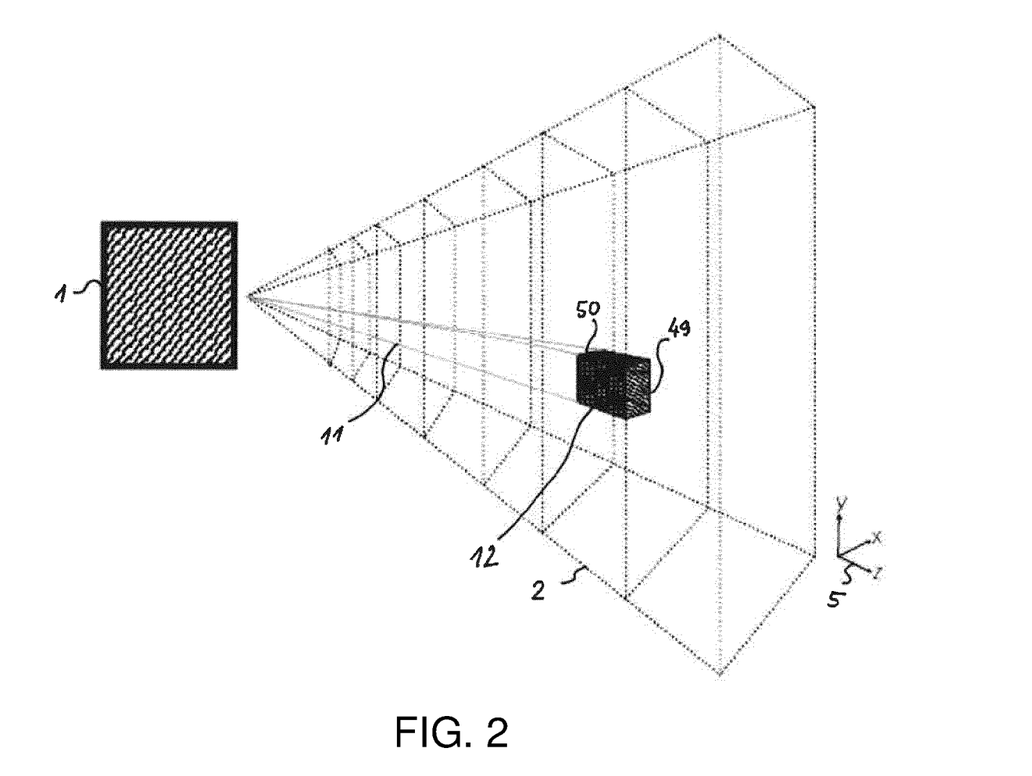
FIG. 2 shows the imaging system with a detail of its field of view.

The equations $component_i = v_{u,i}$ for every picture element 44, for which a logical relation has been formulated, describe a first two-dimensional profile 49 and the equations $component_i = v_{l,i}$ for every picture element 44, for which a logical relation has been formulated, describe a second two-dimensional profile 50, wherein the volume 12 is confined by the first two-dimensional profile 49 and the second two-dimensional profile 50. FIG. 2 shows the imaging system 1 together with the field of view 2, wherein a line of sight 11 of a single photo element 44 is shown. The lines of sight of all the photo elements 44 form the field of view 2. Further shown in FIG. 2 is the volume 12 for the single photo element, wherein the volume 12 is confined by the first two-dimensional profile 49, that is facing away from the lens 6, and by the second two-dimensional profile 50, that is facing towards the lens 6. With the Cartesian coordinate system 5 displayed in FIG. 2 the logical relation for the single photo element 44 is $v_l \leq z \leq v_u$, with $z=v_u$ describing the first two-dimensional profile 49 and $z=v_l$ describing the second two-dimensional profile 50. It is also conceivable to set $v_l = -\infty$, whereby the volume 12 is confined on a first side by the first two-dimensional profile 49 and on a second side, arranged opposing the first side, by the field of view 2. It is also conceivable to formulate logical relations for a plurality of photo elements. The first and second two-dimensional profile 49, 50 for the plurality of photo elements can have an arbitrary shape in the field of view 2, for example the plurality of photo elements can have the shape of a rectangle or the plurality of photo elements can have an arcuate shape.

The imaging system 1 includes a processing unit 9 configured to determine for each photo element 44 if the distance vector fulfils the logical relation. This is the case when a surface of the object 4, that is facing towards the lens 6 is located within the volume 12. The processing unit 9 is further configured to output a trigger signal when at least one of the logical relations is fulfilled. The processing unit 9 can also be configured to output the trigger signal when a plurality of logical relations for neighbouring photo elements 44 is fulfilled. With the plurality of logical relations only objects 4 exceeding a threshold size cause the processing unit 9 to output the trigger signal.

It is possible that the two-dimensional profiles have the shape of an object. If then the plurality of logical relations has to be fulfilled, in particular the logical relations for a line and/or for a column of neighbouring photo elements, it is then possible that the trigger signal is only output when an object with the shape of the two-dimensional profiles is located within the volume. For example, the two-dimensional profiles can be shaped such that only a car of a specific type can cause the output of the trigger signal.

The predetermined upper values $v_{u,i}$ and the predetermined lower values $v_{l,i}$ can be chosen such that the volume 12 has such extensions that with a given repetition rate for determining the coordinate images and an assumed maximum speed of the object 4, at least one coordinate image shows the surface of the object 4 within the volume 12. For example, if the imaging system 1 can record the coordinate images with a repetition rate of 1 kHz and a maximum speed of 300 km/h for the object 4 is assumed, the volume 12 needs to have a length of at least 300 km/h*$10^{-3}$ s=8.33 cm in the moving direction of the object 4 to ensure that at least one coordinate image causes the processing unit 9 to output the trigger signal.

The imaging system 1 further includes an interface 10 with which a user can set the logical relations. The connection between the interface 10 and the other parts of the imaging system 1 can for example be a LAN- or a W-LAN-connection and the logical relations are stored in the second memory unit 8 by a software update. The first memory unit 7 and the second memory unit 8 can be implemented as non-transitory computer-readable storage media. It is also conceivable that the second memory unit 8 is an EPROM that can only be updated by the manufacturer.

Figure 3:
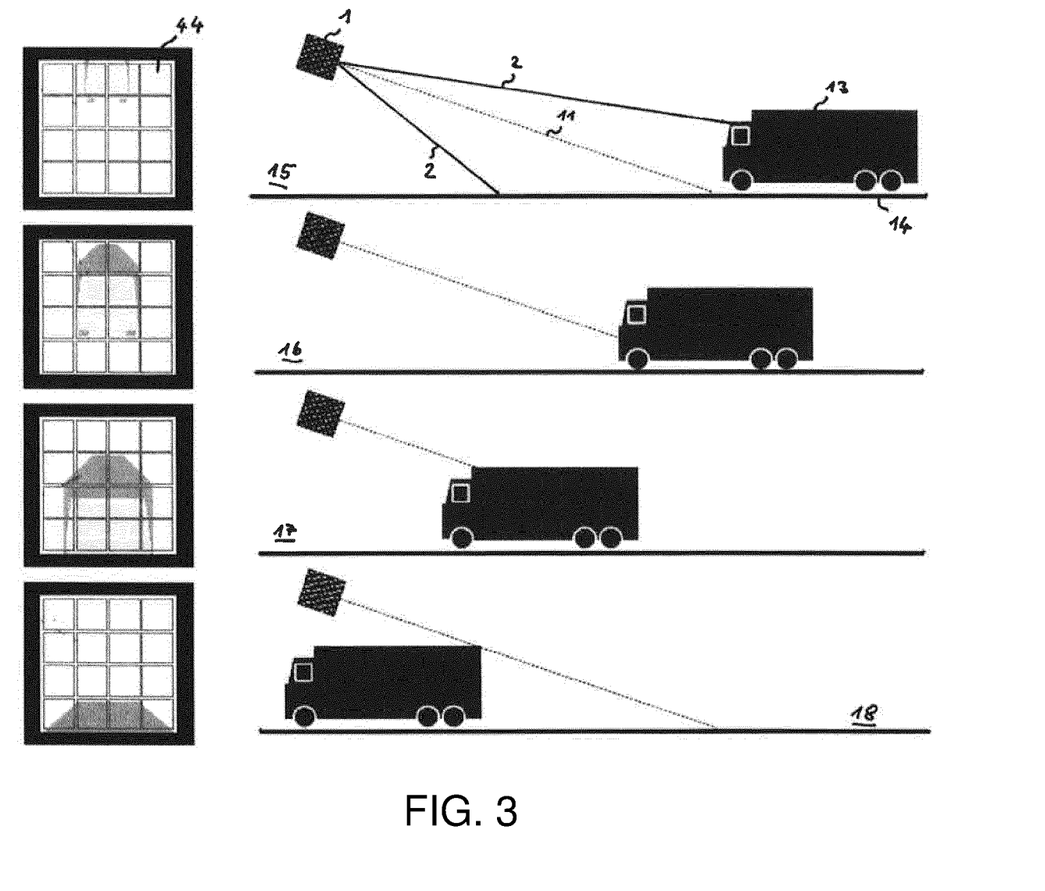
FIG. 3 shows a first scene at different points in time together with corresponding images of the scene as provided by the imaging system.

FIG. 3 shows a first scene including an automobile 13 on a street 14, wherein the imaging system 1 is located above the automobile 13 and is oriented diagonally downwards so that its field of view 2 includes a section of the street 14. The imaging system 1 is further oriented such that the automobile 13 driving on the street 14 drives through the field of view at a certain point in time. The first scene is shown at four different points in time and the imaging system 1 determines a coordinate image at each point in time. At the first, second, third, and fourth point in time the automobile 13 is located at a first position 15, a second position 16, a third position 17, and a fourth position 18, respectively. For determining the coordinate images, the imaging system 1 images a field of view 2 onto its array 3 of photo elements 44. The respective image of the field of view 2 for each point in time is also shown in FIG. 4.

Figure 6:
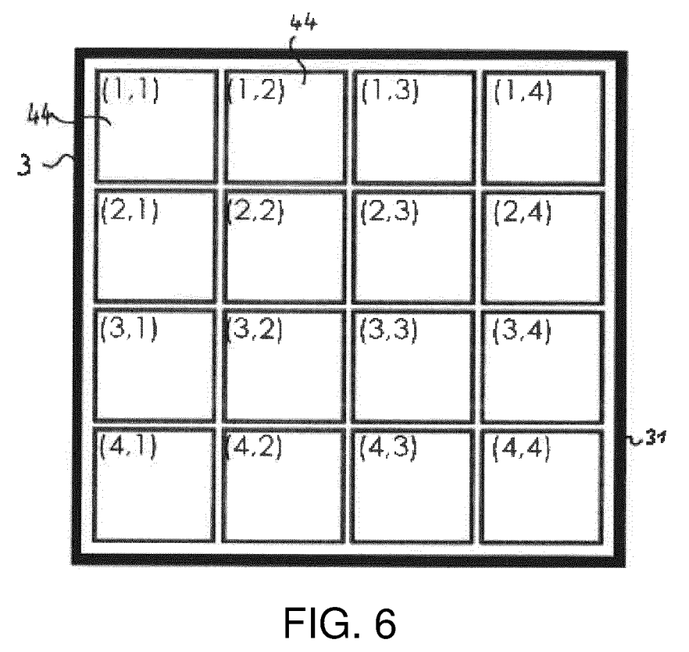
FIG. 6 shows a first view of an array of photo elements.
Figure 7:
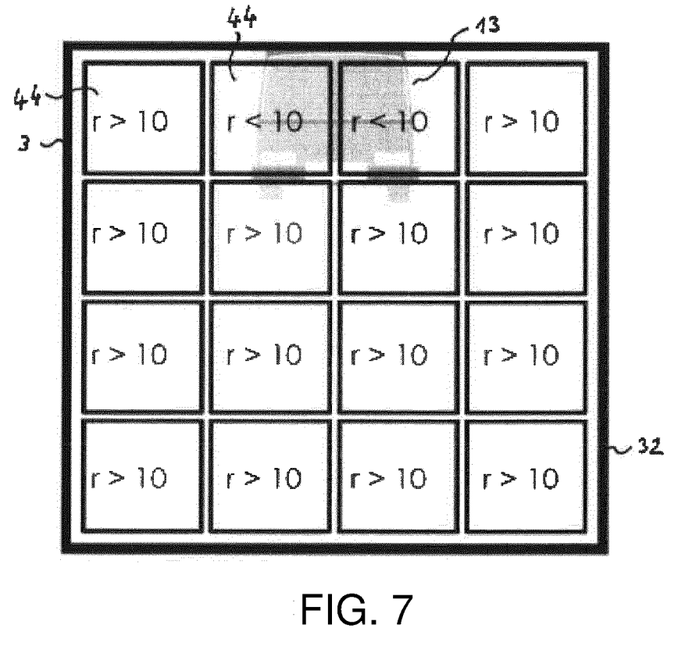
FIG. 7 shows a second view of an array of photo elements.
Figure 8:
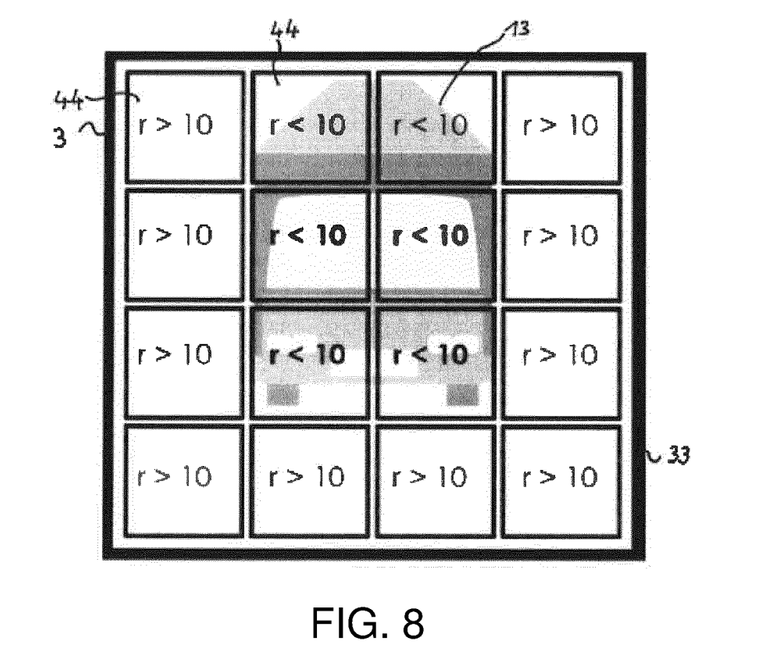
FIG. 8 shows a third view of an array of photo elements.

FIGS. 6, 7, 8, and 9 show a first view 31, a second view 32, a third view 33, and a fourth view 34 of the array 3, respectively. As shown in FIG. 6, each photo element 44 is denoted by a pair of numbers (l,c), wherein l is the line and c is the column in the array, respectively. FIG. 4 shows the line of sight 11 of the photo element (2,2). FIGS. 7 and 8 show the distance vectors for each photo element 44 as determined by the imaging system 1 with the automobile 13 at the first point in time and at the second point in time, respectively. The first exemplary embodiment for the distance vectors is chosen, which means that each distance vector consists of the distance r. As it can be seen in FIGS. 3 and 7, the automobile 13 is located in the field of view 2 at the first point in time and causes the distance vectors to drop to a value r<10 for the photo elements (1,2) and (1,3), whereas for the other photo elements the distance vector is r>10. At the second point in time the distance vectors for the additional photo elements (2,2), (2,3), (3,2) and (3,3) drop to a value r<10, whereas for the remaining photo elements the distance vector is r>10.

Figure 9:
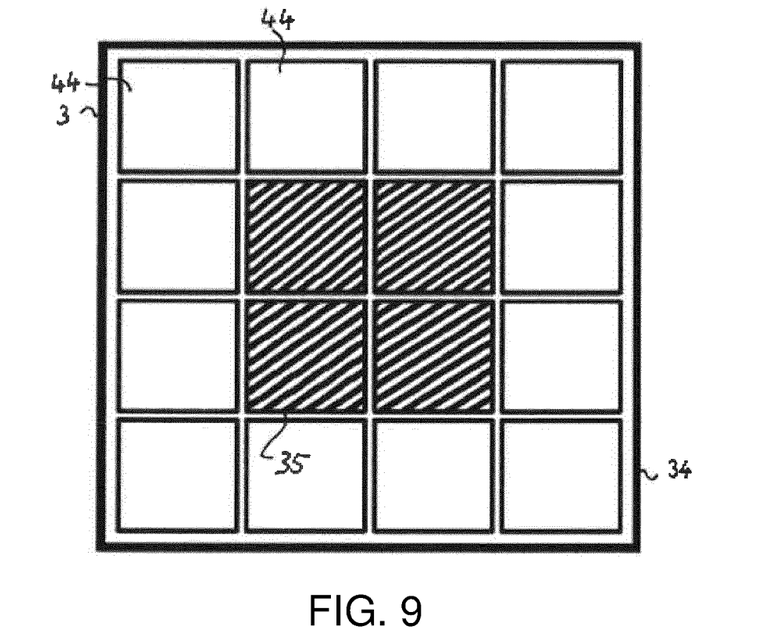
FIG. 9 shows a fourth view of an array of photo elements.

The hatched photo elements 35 in FIG. 9 denote photo elements 35 for which a logical relation is set up, which is the case for the photo elements (2,2), (2,3), (3,2) and (3,3). The logical relation for each of the photo elements 35 is r≤10, but it is also conceivable to set up a different logical relation for each of the photo elements 35. By determining for each of the photo elements 35 if the distance vector at the first point in time fulfils the logical relation, it follows that none of the logical relations is fulfilled, whereas by determining for each of the photo elements 35 if the distance vector at the second point in time fulfils the logical relation it follows that for all of the photo elements 35 the logical relations are fulfilled.

Figure 4:
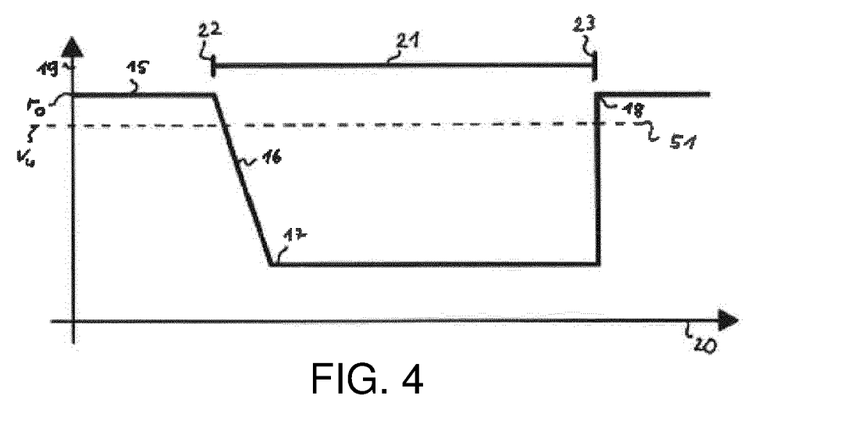
FIG. 4 shows a signature of an automobile described by a plot of distances r over time.

FIG. 4 shows a first trajectory of the automobile 13 recorded by the photo element (2,2), wherein the first trajectory is described by a plot of the distance r 19 over time 20. Also shown in the plot is the logical relation 51 that is fulfilled if the distance equals or is lower than the upper value $v_u$. At the first point in time, with the automobile 13 being in the first position 15, the imaging system 1 determines for the photo element (2,2) a distance $r_0$ that is related to the absence of an object in the line of sight 11 of the photo element (2,2). The distance $r_0$ is the distance between the photo element (2,2) and the street 14 in the direction of the line of sight 11. In the following, the automobile 13 drives in the line of sight 11 causing a drop of the distance r to r<$r_0$ at a start point in time 22. At the second point in time, with the automobile 13 being in the second position 16, the distance r between the front end of the automobile 13 and the photo element (2,2) is determined. At the third point in time, with the automobile 13 being in the third position 17, the distance r between the roof of the automobile 13 and the photo element (2,2) is determined. When the automobile 13 drives out of the line of sight 11, the distance r falls back to $r_0$ at an end point in time 23, which in FIG. 3 occurs at the fourth point in time, with the automobile 13 being in the fourth position 18. The plot between the start point in time 22 and the end point in time 23 is a signature 21 of the automobile 13, wherein the signature 21 can be used for a classification of the automobile. The classification can be carried out by comparing the signature 21 with a reference signature. Since for the signature 21 the first embodiment for the distance vectors is used, with the distance r being the only component, the same orientation of the field of view 2 with respect to the moving direction of the automobile 13 for generating the signature 21 and for generating the reference signature has to be applied in order to enable the comparison of the signature 21 with the reference signature.

Figure 5:
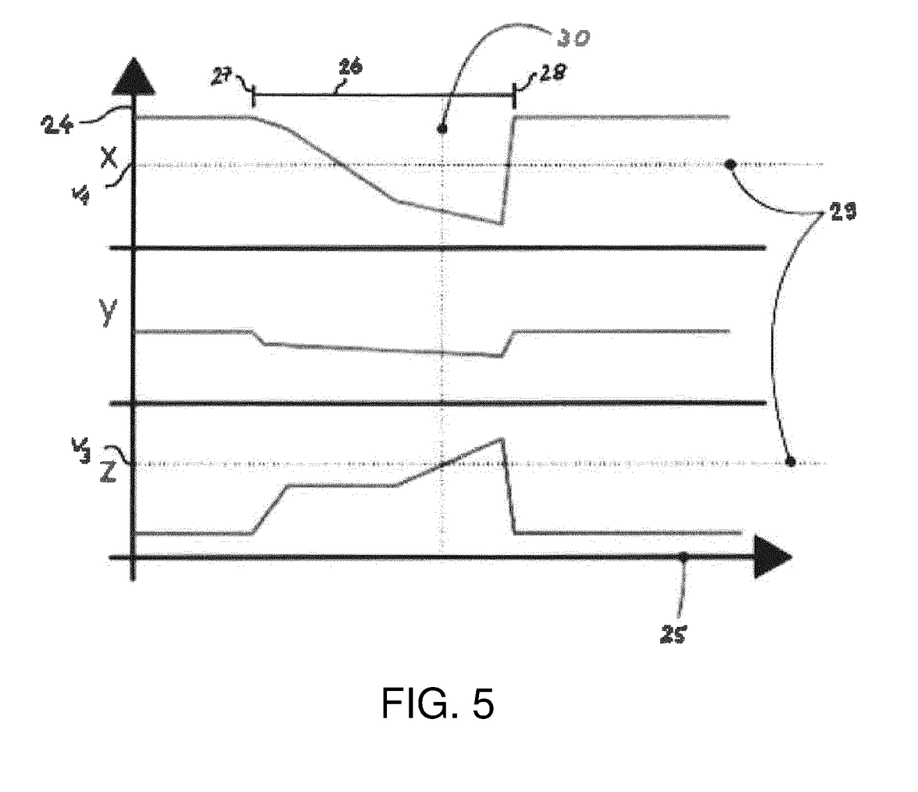
FIG. 5 shows a signature of an automobile described by a plot of components x, y z over time.

FIG. 5 shows a second trajectory of another object 4, 13 recorded by the photo element 44, wherein the third embodiment for the distance vectors is used. The second trajectory is described in the Cartesian coordinate system 5 by a respective plot of components 24 x, y, z over time 25. Also shown in the plot is the logical relation 29 that is fulfilled if x≤$v_1$ and z≥$v_3$, with $v_1$ being an upper value for the component x and $v_3$ being a lower value for the component z. The first point in time, when the logical relation 29 is fulfilled is a trigger point in time 30. As it can be seen in FIG. 5, at early times 25, the components 24 x, y, z are constant and related to the absence of the object in the line of sight 11. At a start point in time 27, the object 4, 13 enters the line of sight 11, causing a change in the components 24 x, y, z and at an end point in time 28 the object 4, 13 leaves the line of sight 11, causing a fall back of the components 24 x, y, z back to the values related to the absence of an object. The plots between the start point in time 27 and the end point in time 28 of the components x, y, z define a signature 26 of the object 4, 13. If the coordinate system 5 is oriented towards the moving direction of the object, for example with a first component being oriented in the moving direction of the object and the other two components being oriented perpendicular to the first component, in particular with one of the other two components being perpendicular to a ground or a street, it is possible to carry out a comparison between the signature 26 and a reference signature without it is required that the orientation of the line of sight 11 with respect to the moving direction of the object 4, 13 is the same for determining the signature 26 and the reference signature. With this orientation of the Cartesian coordinate system it is also possible to determine velocity components of an automobile 13 in the direction of a lane of the street 14 and transversal to the street 14.

Figure 10:
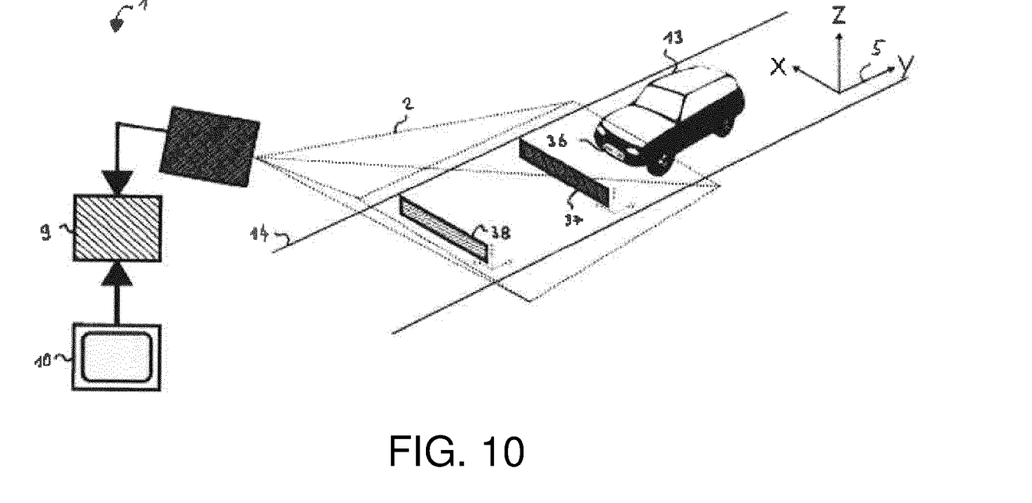
FIG. 10 shows a second scene including an automobile and a street.

FIG. 10 shows a second scene including an automobile 13 on a street 14, wherein the imaging system 1 is located above the automobile 13 and is oriented diagonally downwards so that its field of view 2 includes a section of the street 14 and the automobile 13 driving on the street 14 drives through the field of view 2 at a certain point in time. A first trigger location 37 and a second trigger location 38 are located in the field of view 2, wherein the trigger locations 37, 38 are arranged such that the automobile 13 first enters the first trigger location 37 and afterwards the second trigger location 38. The first trigger location 37 has a first volume and the second trigger location 38 has a second volume. The first and second volumes are described by a respective set of logical relations. FIG. 10 shows for each trigger location 37, 38 a respective two-dimensional profile confining one side of each volume. The volumes are such that they extend in the moving direction of the automobile 13 from the respective two-dimensional profile. It is conceivable that the volumes extend to the end of the field of view 2 or that they extend to a respective second two-dimensional profile.

When the automobile 13 enters the first volume that belongs to the first trigger location 37, the processing unit 9 outputs a first trigger signal. The first trigger signal is then used to start another action of the imaging system 1. For example, the trigger signal can cause the imaging system 1 to take a sequence of consecutively taken coordinate images, wherein each coordinate image is provided with a timestamp. It is conceivable that the coordinate image causing the trigger signal is the first coordinate image of the sequence or that the sequence starts after the coordinate image causing the trigger signal. Since it is possible to store a plurality of coordinate images in the first memory unit 7, it is also possible that coordinate images taken before the coordinate image causing the trigger signal are part of the sequence.

When the automobile 13 enters the second volume that belongs to the second trigger location 38, the processing unit 9 outputs a second trigger signal. The second trigger signal can be used to end the sequence. Alternatively, it is possible to end the sequence when the distance vector drops back to a distance vector related to the absence of an object in the line of sight of the photo element 44. The drop back to the distance vector related to the absence of an object is for example described for FIGS. 4 and 5. A speed of the automobile 13 can be determined by using the time difference between the first trigger signal and the second trigger signal as well as the distance between the two two-dimensional profiles confining the first and second volume on a side opposing the moving direction. A velocity of the automobile 13 can be determined by using the sequence of the coordinate images.

The array 3 of the photo elements 44 is also configured to take a photograph of the field of view. The photograph includes intensity information for each of the photo elements 44 and can be taken only by using ambient light or by illuminating the field of view 2 with a photoflash. Since the same array 3 is used for determining distance vectors and intensity, the imaging system 1 provides a photo element by photo element correspondence of intensity and distance information. The output of the trigger signal by the processing unit 9 can start a photograph or a sequence of photographs in order to record a video sequence of the field of view 2. It is also conceivable that the sequence includes the coordinate images alternating with photographs, so that two complementary descriptions of the field of view are available. It is also conceivable to embed the timestamp within the photograph so that a manipulation of the timestamp is not possible after taking the photograph.

Figure 11:
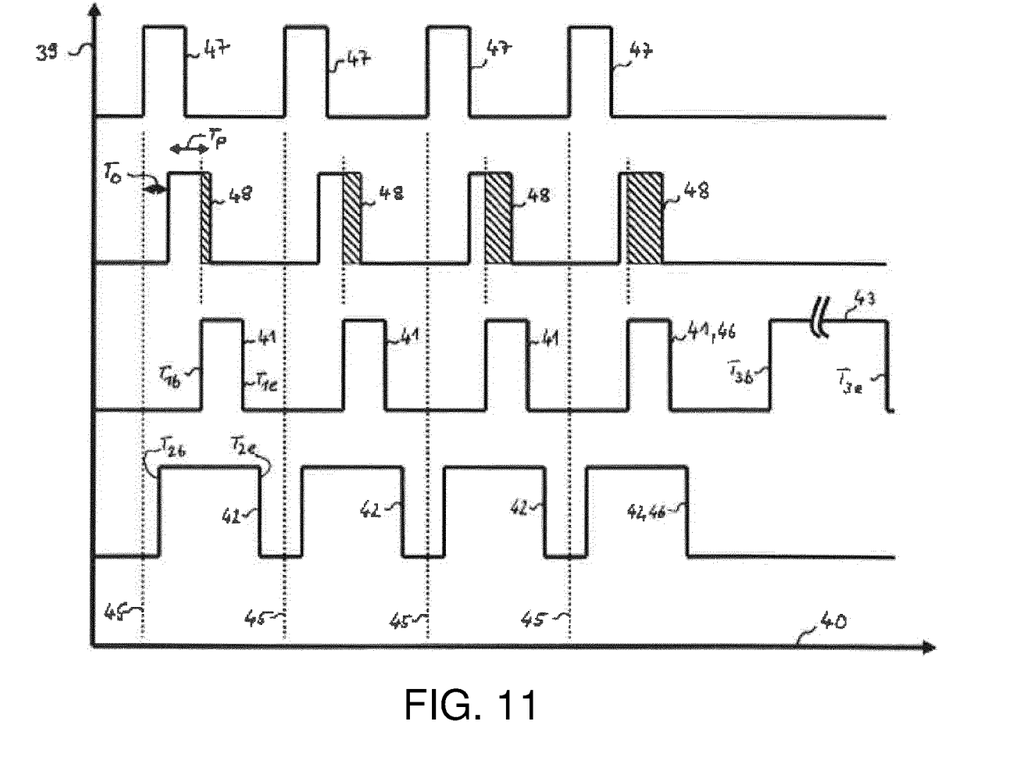
FIG. 11 shows temporal profile diagrams with intensities and different integration gates.

FIG. 11 shows temporal profile diagrams of the light pulses and of temporal integration gates of the photo elements 44 in order to explain how the imaging system 1 determines the distances and how the photographs are taken. It is plotted the intensity 39 versus time 40. The imaging system 1 illuminates the field of view 2 with light pulses 47 with a rectangular temporal profile and a duration $T_p$. The photo elements 44 capture the light pulses 48 after they have been back reflected from the field of view 2 during a first temporal integration gate 41 having an integration start point in time $T_{1b}$ and an integration end point in time $T_{1e}$ as well as during a second temporal integration gate 42 having an integration start point in time $T_{2b}$ and an integration end point in time $T_{2e}$. The integration gates 41, 42 have such a predetermined delay to the emission start point in time 45 of the light pulses 47 that $T_0$ is between $T_{1b}$ and $T_{1e}$ in order to determine a signal value U with the signal value U depending on the intensity $I_p$ and the duration of the light pulse 48 arriving on the photo element 44 during the first integration gate 41, with $T_0$ being the first point in time when the light pulse arrives on the photo element. For the second integration gate 42 $T_0$ and $T_0+T_p$ are between $T_{2b}$ and $T_{2e}$ to determine the intensity $I_p$ of the light pulses 48 arriving on the photo element. The first and second integration gate 41, 42 can be applied simultaneously by using two photo elements 44 that are arranged adjacent to each other or by using two arrays 3 and splitting the incoming light by a beam splitter and directing each split light on the respective array 3. It is also possible to apply both integration gates 41, 42 consecutively by using one photo element 44.

The hatched areas in FIG. 11 are proportional to the signal value U and the vertical extension of the hatched areas is proportional to the intensity $I_p$. The intensity $I_p$ can be determined by the known duration of the light pulses $T_p$ and the signal value $U_2$ as determined by the second integration gate 42 by $I_p=U_2/T_p$. From FIG. 11 one can derive the equation $T_0+T_p=T_{1b}+U/I_p$, whereby $T_0=T_{1b}-T_p+U/I_p$. The distance r can then be calculated by $r=0.5*c*T_0$, with c being the speed of light in the medium in which the field of view 2 is located.

In FIG. 11 the imaging system 1 determines distances r until the according distance vector fulfils the logical relation, which occurs with the integration gate 46. The processing unit 9 outputs the trigger signal that causes the imaging system 1 to take a photograph by a third integration gate 43, that is applied without illuminating the field of view with the light pulses and is so long that a sufficient amount of light for taking a photograph arrives on the array 3.

It is possible to determine the location of a number license plate 36 of the automobile 13 by identifying the photo elements 44 that determine the highest intensities $I_p$. The location can be used to zoom the imaging system 1 to the location of the number license plate and/or to another location relative to the location of the number license plate and subsequently to take a photograph of the number license plate 36 and/or of the other location with a high magnification. The zooming can be performed by displacing the lens 6, by extracting the pixels of the locations from the photograph and/or by software magnification. The interface 10 can be configured such that an image with the full field of view 2 and at the same time an image with the zoomed location is provided. The boundary of the zoomed location can also be marked within the image of the field of view 2. The array 3 includes a sufficient high number of photo elements 44 so that a high resolution of the magnified image can be achieved. The location of the number license plate 36 in the sequence of the coordinate images can also be used to determine a velocity of the automobile 13.

Figure 12:
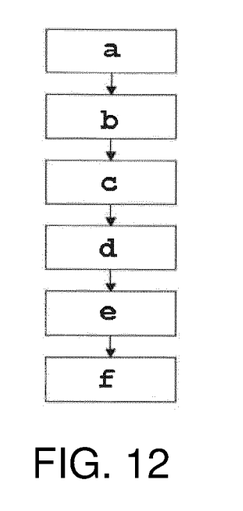
FIG. 12 shows a first flow chart of a method for configuring the imaging system according to an exemplary embodiment of the invention.

FIG. 12 shows a first flow chart that describes a preferred method for configuring the imaging system. In step a, the interface 10 is opened, then in step b, a coordinate image of the field of view 2 without objects being present is captured. In step c, at least one trigger location with a respective volume 12 is defined in the coordinate image. An action or an action sequence, which the imaging system 1 is supposed to perform, is defined for each trigger location in step d. In step e, the trigger locations and the actions are stored in the imaging system and afterwards, in step f, a continuous taking of coordinate images is initiated.

Figure 13:
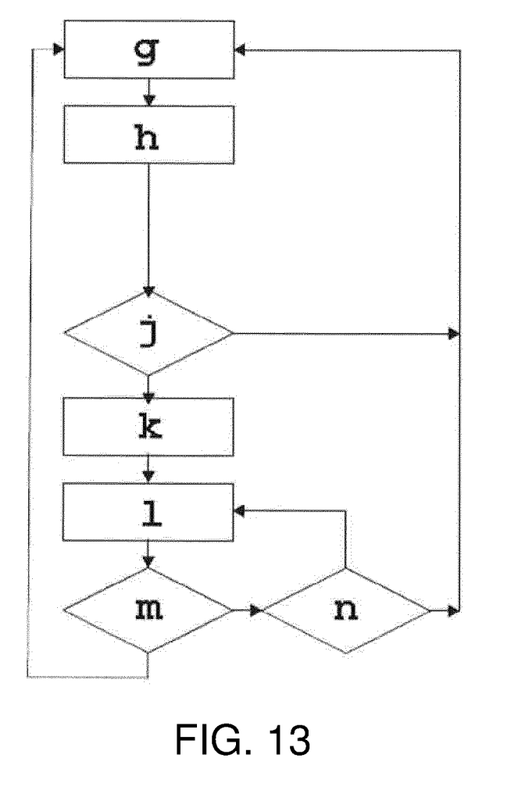
FIG. 13 shows a second flow chart of a method for monitoring the field of view according to an exemplary embodiment of the invention.

FIG. 13 shows a second flow chart that describes a method for monitoring the field of view 2. In step g, a coordinate image is determined by the imaging system 1 and subsequently stored together with a timestamp in step h in a ring buffer. In the ring buffer, a plurality of the coordinate images is stored together with the respective timestamps. When a new coordinate image is to be stored in the ring buffer, the coordinate image with the oldest timestamp is overwritten by the new coordinate image. In step j, the processing unit 9 determines for each photo element that has been provided with a logical relation, if the distance vector fulfils the logical relation. If this is the case, the method continues with step k, if not, with step g. In case a plurality of trigger locations has been defined in step c, it is determined for each of the trigger locations, if the logical relation has been fulfilled. In step k, an action sequence is looked up, wherein the action sequence can be different for each trigger location 37, 38. In step l, the sequence is run and in step m, it is determined if the sequence is completed. If the sequence is completed, step g is executed. If the sequence is not completed step n is executed. In the optional step n, it is checked if a second trigger signal corresponding to the second trigger location 38 was output. If this is the case, step g is executed, otherwise step 1.

Figure 14:
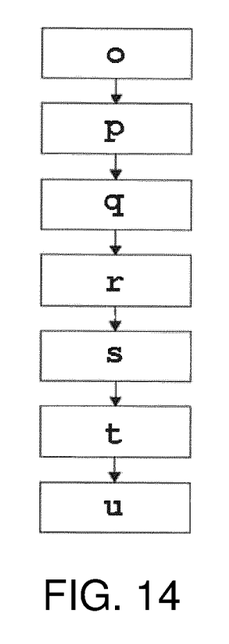
FIG. 14 shows a third flow chart of an action sequence according to an exemplary embodiment of the invention.

FIG. 14 shows a third flow chart that shows an example for an action sequence. Step o denotes the determination of a coordinate image that causes the output of the trigger signal. In step p, the array captures a photograph of the field of view and in step q, the location of the number license plate 36 is identified by the intensities $I_p$ as determined for the coordinate image. The location is then used to extract the number license plate 36 from the photograph and the extracted number license plate 36 is stored. In step r, a second coordinate image is determined and after waiting for a predefined period of time in step s, a third coordinate image is determined in step t. In step u, the speed and direction of the automobile is determined by using the second and third coordinate image and the predetermined period of time.

It is understood that the foregoing description is that of the example embodiments of the invention and that various changes and modifications may be made thereto without departing from the spirit and scope of the invention as defined in the appended claims.

LIST OF REFERENCE NUMERALS 1 imaging system
2 field of view
3 array
4 object
5 Cartesian coordinate system
6 lens
7 first memory unit
8 second memory unit
9 processing unit
10 interface
11 line of sight of a single pixel
12 volume
13 automobile
14 street
15 first position
16 second position
17 third position
18 fourth position
19 distance
20 time
21 signature including a plot of distances r
22 start point in time of signature sequence
23 end point in time of signature sequence
24 components x, y, z
25 time
26 signature including a plot of distances x, y, z
27 start point in time of signature
28 end point in time of signature
29 logical relation
30 trigger point in time
31 first view
32 second view
33 third view
34 fourth view
35 photo elements with a logical relation
36 license plate
37 first trigger location
38 second trigger location
39 intensity
40 time
41 first integration gate
42 second integration gate
43 third integration gate
44 photo element
45 emission start point in time
46 gate delivering trigger signal
47 emitted light pulses
48 light pulses arriving on photo element
49 first two-dimensional profile
50 second two-dimensional profile
51 logical relation

What is claimed is:

1. An imaging system comprising:
   a two-dimensional array comprising photo elements on which the field of view is imaged;
   a processing unit configured to
      determine, for the photo elements, respective distances between the photo elements and one or more surfaces located in a field of view of the imaging system based on analysis of light emitted by the imaging system into the field of view and subsequently arriving on the photo elements,
      determine respective distance vectors based on the distances, wherein the distance vectors comprise respective distance components having values that are based on the distances, and
      aggregate the distance vectors to yield a coordinate image;
   a first memory unit configured to store the coordinate image; and
   a second memory unit configured to store logical relations respectively corresponding to at least a subset of the photo, wherein the logical relations define respective upper values and lower values of the distance components, and the respective upper values and lower values defined by the logical relations collectively define a volume in the field of view having a shape corresponding to an object to be detected,
   wherein the processing unit is further configured to
      determine, based on analysis of the distance vectors, whether the object to be detected is present within the volume, and
      output a trigger signal in response to determining that the object to be detected is present within the volume.

2. The imaging system according to claim 1, wherein: the volume has dimensions that ensure that, given a repetition rate at which coordinate images are captured and an assumed maximum speed of the object, at least one coordinate image shows a surface of the object within the volume.

3. The imaging system according to claim 2, wherein at least one of the lower value is minus infinity or at least one of the upper values is plus infinity.

4. The imaging system according to claim 1, further comprising an interface configured to allow the logical relations to be defined by user input.

5. The imaging system according to claim 1, wherein the photo elements are configured to take a photograph of the field of view.

6. The imaging system according to claim 1, wherein the imaging system is a stationary system.

7. A method comprising:
   defining, for a two-dimensional array of an imaging system comprising a plurality of elements configured to image a field of view, logical relations respectively corresponding to at least a subset of the elements, wherein the logical relations define respective upper distance values and lower distance values, and the respective upper distance values and lower distance values defined by the logical relations collectively define a volume in the field of view having a shape corresponding to object to be detected;

determining, based on analysis of light incident on the elements, respective distances between the elements and one or more surfaces located in the field of view;

determining respective distance vectors corresponding to the distances, wherein the distance vectors comprise respective distance components having values that are based on the distances;

generating a coordinate image based on an aggregation of the distance vectors;

determining, based on analysis of the distance vectors, whether the object to be detected is present within the volume; and in response to determining that the object to be detected is present within the volume, outputting a trigger signal.

8. The method according to claim 7, wherein the determining the respective distances comprises:

illuminating the field of view with light pulses during a period of time $T_p$;

capturing, at the elements, reflected light pulses back-reflected from the field of view during a first integration gate having an integration start point at a point in time $T_{1b}$ and an integration end point at a point in time $T_{1e}$ and during a second integration gate having an integration start point at a point in time $T_{2b}$ and an integration end point at a point in time $T_{2e}$, wherein the first and second integration gates have a defined delay relative to an emission start point in time of the light pulses;

determining, for respective elements of the elements, signal values U based on respective intensities $I_p$ and respective durations of reflected light pulses arriving on the elements during the first integration gate; and calculating the respective distances based on the signal values U and the intensities $I_p$.

9. The method according to claim 8, wherein:

the object is an automobile; and the method further comprises:

identifying a position of a license number plate of the automobile by identifying a subset of the elements that report highest intensities $I_p$ of the reflected light pulses arriving on the two-dimensional array.

10. The method according to claim 9, further comprising:

capturing a sequence of coordinate images;

triggering the capturing of the sequence with the trigger signal;

timestamping the coordinate images; and determining a velocity of the automobile based on the position of the license number plate in respective coordinate images of the sequence of coordinate images.

11. The method according to claim 9, further comprising:

taking a photograph of a detail of the field of view in response to the trigger signal, wherein a position of the detail is located with respect to the position of the license number plate.

12. The method according to claim 7, wherein:

dimensions of the volume are set to ensure that, for a given repetition rate for determining the coordinate image and an assumed maximum speed of the object, at least one coordinate image includes the surface of the object within the volume.

13. The method according to claim 12, wherein at least one of the logical relations defines a lower distance value of minus infinity or at least one of the logical relations defines an upper distance value of plus infinity.

14. The method according to claim 7, wherein the outputting the trigger signal comprises outputting the trigger signal in response to determining that a plurality of logical relations defined for neighboring elements of the elements are satisfied by respective distance vectors generated for the neighboring elements.

15. The method according to claim 7, wherein:

the distance vectors comprise spherical coordinates (r, θ, Φ), where r is the distance, θ is a polar angle, and Φ is an azimuthal angle.

16. The method according to claim 7, further comprising:

defining, for an element of the element, a pair of angles θ, Φ of a spherical coordinate system, wherein the pair of angles define a line of sight of the element;

the distance vector for the element comprises Cartesian coordinates (x, y, z), where x is a first component, y is a second component and z is a third component; and the Cartesian coordinates (x, y, z) are determined by a coordinate transformation from (r, θ, Φ) to (x, y, z), where r is a distance corresponding to the element.

17. The method according to claim 7, further comprising:

capturing at least one photograph with the two-dimensional array in response to the outputting of the trigger signal.

18. The method according to claim 7, further comprising:

capturing a sequence of coordinate images by triggering captures of the coordinate images in response to repeated instances of the trigger signal; and timestamping the coordinate images.

19. The method according to claim 18, further comprising ending the capturing of the sequence of coordinate images in response to determining that the distance vectors comprise distance components having values indicative of an absence of an object in a line of sight of the element.

20. The method according to claim 18, wherein:

the trigger signal is a first trigger signal, and the method further comprises:

defining second logical relation respectively corresponding to at least the subset of the elements;

outputting a second trigger signal in response to determining that the second logical relation is satisfied by a distance component of one or more of the distance vectors; and ending the capturing of the sequence in response to the outputting of the second trigger signal.

21. The method according to claim 20, further comprising:

determining a speed of the object based on a time difference between the first trigger signal and the second trigger signal.

22. The method according to claim 18, further comprising:

generating a signature for at least one element of the elements, wherein the signature is a plot of the distance vector as a function of time; and classifying the object based on the signature.

23. The method of claim 7, wherein the determining the respective distances comprises:

illuminating the field of view with light that switches its intensity at a point in time $T_c$ from an intensity $I_{out,h}$ to an intensity $I_{out,l}$ lower than $I_{out,h}$ and at a point in time $T_c+T_p$ back to intensity $I_{out,h}$;

capturing, by the elements, reflected light back-reflected from the field of view during a first integration gate having an integration start point at a point in time $T_{1b}$ and an integration end point at a point in time $T_{1e}$ and during a second integration gate having an integration start point at point in time $T_{2b}$ and an integration end point at point in time $T_{2e}$, wherein the integration gates have a delay relative to $T_c$ during which either $T_0$ or $T_0+T_p$ is between $T_{1b}$ and $T_{1e}$, where $T_0$ is a first point in time at which light with an intensity $T_{in,l}$ corresponding to the lower intensity $I_{out,l}$ arrives on the element;

determining the signal values U based on respective amounts of light arriving on the elements during the first integration gate and during which $T_{2e}$ is earlier than $T_0$ or $T_{2b}$ is later than $T_0+T_p$ or $T_0$ and $T_0+T_p$ are between $T_{2b}$ and $T_{2e}$;

determining intensities $I_{in,h}+I_p$ of light arriving on the elements and corresponding to the higher intensity $I_{out,h}$; and calculating the respective distances based on the signal values U and the intensities $I_{in,h}=I_p$.

* * * * *